United States Patent [19]

Wiegand, Jr. et al.

[11] Patent Number: 4,878,383

[45] Date of Patent: Nov. 7, 1989

[54] OPTICAL FLUID LEVEL SENSOR

[75] Inventors: Walter J. Wiegand, Jr., Glastonbury; Robert H. Bullis, Avon, both of Conn.

[73] Assignee: United Technologies Corporation, Hartford, Conn.

[21] Appl. No.: 115,304

[22] Filed: Nov. 2, 1987

[51] Int. Cl.$^4$ ............................................. G01F 23/00
[52] U.S. Cl. ...................................................... 73/293
[58] Field of Search .................. 73/293, 327; 116/227, 116/DIG. 5; 250/577; 340/619

[56] References Cited

U.S. PATENT DOCUMENTS

| 2,943,530 | 7/1960 | Nagel | 73/327 |
| 3,543,581 | 12/1970 | Ryder | 73/327 |
| 4,353,252 | 10/1982 | Jeans | 73/293 |

FOREIGN PATENT DOCUMENTS

| 735926 | 5/1980 | U.S.S.R. | 73/293 |
| 934322 | 8/1963 | United Kingdom | 73/293 |

Primary Examiner—William A. Cuchlinski, Jr.
Assistant Examiner—W. Morris Worth
Attorney, Agent, or Firm—Lloyd D. Doigan

[57] ABSTRACT

The present invention is related to a sight glass(10) that utilizes both reflected light at a glass to air interface(40) as well as the light transmitted through a glass to fluid to glass interface(44) to form a light pattern that is indicative of the true fluid level. By requiring that light always appear in either an "air" or "fluid" channel(42,46), any absence of light is assumed due to film coated surfaces or to other abnormal conditions. An absence of light is a signal that maintenance is required.

13 Claims, 3 Drawing Sheets 4,878,383

OPTICAL FLUID LEVEL SENSOR

TECHNICAL FIELD

This invention relates to optical fluid level sensors.

BACKGROUND ART

Sight glasses are used to provide a visual indication of a fluid level. A sight glass uses the reflection of light caused by a glass to air interface, and the absence of reflection caused by a glass to fluid interface, to provide the visual indication of fluid level. Some fluids, such as gearbox oil, can form a heavy film on sight glass interface surfaces thereby giving a false fluid level reading. The absence of reflected light in such a case may cause one to assume erroneously that fluid levels are adequate. Equipment failure may result.

In helicopter pre-flight inspection, it is required that the fluid levels of various rotor gearboxes be at normal levels. The levels are checked by using a flashlight to examine the appearance of a commercial sight glass that is mounted on the side of each gearbox. Such a procedure may be difficult to perform due to the location of the sight glasses, may be complicated by adverse weather or sea conditions, and may result in false readings. New methods and apparatus of checking for fluid levels are sought.

DISCLOSURE OF INVENTION

The present invention is related to a sight glass that utilizes both the reflected light at a glass to air interface as well as the light transmitted through a glass to fluid to glass interface to form a light pattern that is indicative of the true fluid level. By requiring that light always appear in either an "air" or "fluid" channel, any absence of light is assumed due to fluid coated surfaces or to other abnormal conditions. An absence of light is a signal that maintenance is required.

According to a further aspect of the invention, a signal beam is directed down a first channel and then detected in either a second or third channel depending on whether the fluid level is high or low. If the signal beam is not detected in either of the second or third channels, maintenance is required and the fluid level must be detected by other means.

These and other objects, features and advantages of the present invention will become more apparent in light of the detailed description of a best mode embodiment thereof, as illustrated in the accompanying drawing.

Best Mode for Carrying Out the Invention

Figure 1A:
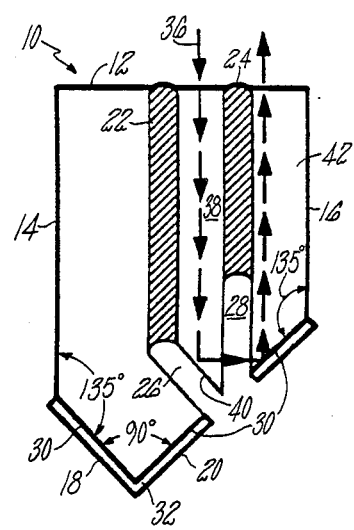
FIG. 1(A-C) is a schematic view of an embodiment of a fluid level sensor of the invention.
FIG. 1D is a top view of the sensor of FIG. (A-C), the sensor having been rotated forward 90° and disposed within a body of fluid.

Referring to FIG. 1A, a side view of an embodiment of the fluid level sensor 10 is shown. The sensor has a flat top portion 12, a left side portion 14 and right side portion 16, each side portion extending downwardly at 90° angle from the top portion, and a left bottom portion 18 and right bottom portion 20. The left bottom portion 18 extends at an angle of about 135° from the left side portion 14. The left bottom portion intersects the right bottom portion at a 90° angle. The right bottom portion 20 extends at about 135° angle from the right side portion 16. A left opaque member 22 and right opaque member 24 each extend downwardly from the top portion. The right bottom portion is broken by a first channel 26 and a second channel 28 which extend to the left and right members 22, 24 respectively.

The sensor 10 is made of a transparent material such as glass. A mirrored surface 30, such as aluminum, coats each bottom portion. Both mirrored surfaces are coated with glass 32, by conventional means, to protect them from interacting with the fluid being measured. The opaque members may be any compatible, non-transmissive material, such as an epoxy.

Figure 1B:
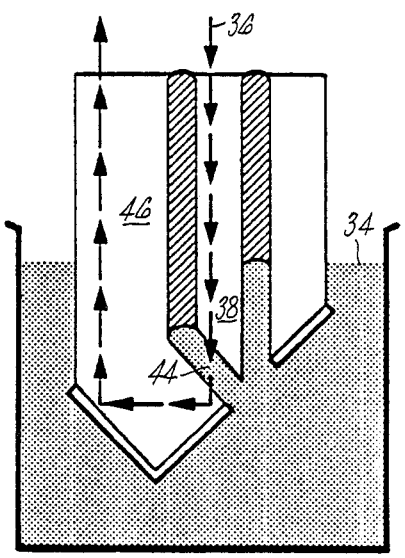
Figure 1C:
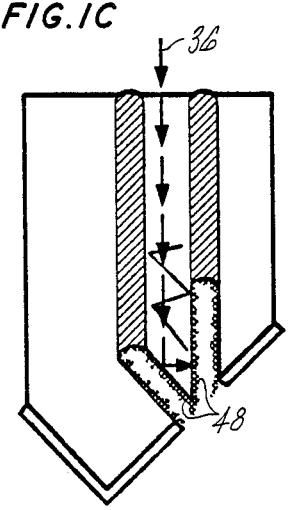
Figure 1D:
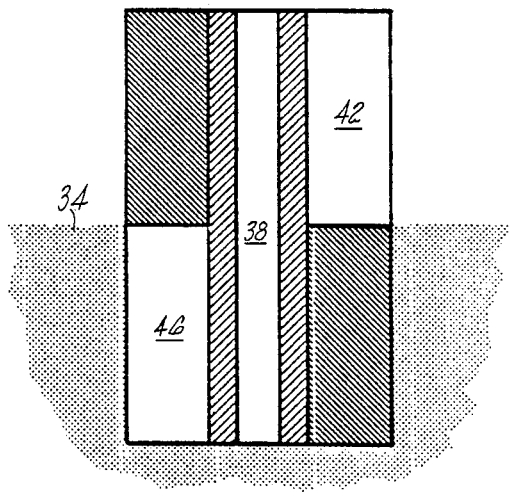

The fluid level sensor is adapted to extend into a body 34 of fluid (see FIGS. 1B and 1D). If the body is full or partially full of fluid, the fluid will extend up the channels 26, 28 to form a signal beam transmissive glass to fluid to glass interfaces, as will be discussed infra.

Referring to FIG. 1A, where the fluid level is not high enough to extend up the channels, a signal beam 36, such as incandescent light, is directed down a middle passageway 38 formed between the two opaque members 22, 24. The light reaches a glass to air interface 40 between the passageway and the channel 26 and is reflected at a 90° angle to the mirrored surface 30 on the right bottom portion 20 and back out a right passageway 42. The light is reflected at the interface 40 because the fluid level does not extend up channel to form a beam transmissive glass to fluid to glass interface.

Referring to FIG. 1B, where the fluid level 34 is high enough to extend up the channels, the signal beam is directed down the middle passageway 38 and passes through the glass to fluid to glass interface 44. The beam is reflected from the right 20 to the left bottom surfaces 18 and out the left passageway 46. In this way, a true fluid level is obtained.

Referring to FIG. 1C, a signal beam 36 is directed down the middle passageway 38 cannot pass to either the left 18 or right bottom portion 20 because of the fluid coating 48 within the channels. Light is lost within a glass to fluid to air interface 50 in the first channel 26 and within a similar fluid to glass to air interface in the second channel 28. If no light is passed through either the left 46 or right passageways 42, a problem, such as low fluid levels, is indicated and maintenance is required.

Referring to FIG. 1D, a top view of the sensor 10 is shown. The sensor is rotated forward on its side within the fluid. The signal beam directed down the middle passageway 38 is reflected up a portion of the left passageway 46 disposed below the level 34. The signal beam is reflected out a portion of the right passageway 42 above the fluid level 34.

Figure 2A:
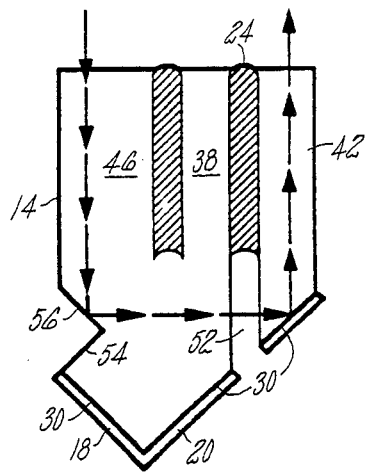
FIG. 2(A-C) is a schematic view of a further embodiment of a fluid level sensor of the invention.
FIG. 2D is a top view of the sensor of FIG. 2(A-C), the sensor having been rotated forward 90° and disposed within a body of fluid.

Referring to FIG. 2A, a second embodiment of the sensor is shown. The sensor is basically similar to the sensor of the first embodiment. However, the sensor has only one channel 52 which extends from the right bottom portion 20 to the right opaque member 24. A right triangular notch 54 is machined into the left side portion 14 at a roughly 45° angle. As before, the bottom surfaces are mirrored.

Referring to FIG. 2A, if the fluid level 34 does not fill the notch 54, a signal beam directed down the left passageway 46 is reflected at the glass to air interface 56 at the notch 54 to the mirrored surface 30 at the right bottom portion 20 and out the right passageway 42.

Figure 2B:
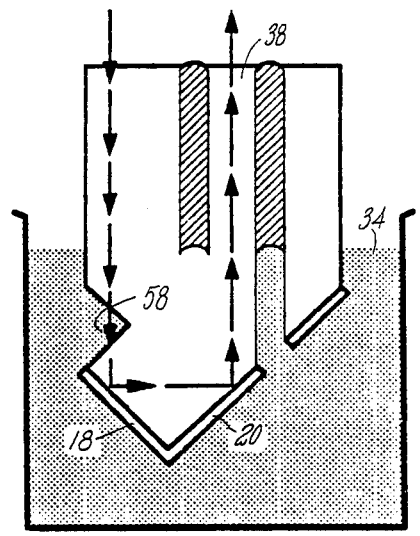

Referring to FIG. 2B, when fluid level 34 fills the notch 54, the signal beam passes down the left passageway 46 through the glass to oil to glass interface 58, and reflects from the left bottom portion 16 to the right bottom portion 20 and out the middle passageway 38.

Figure 2C:
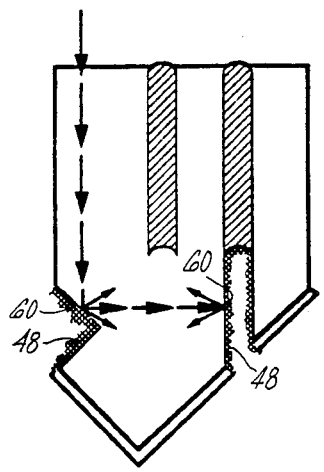

Referring to FIG. 2C, with fluid film 48 coating the interfaces, the signal beam passes into the left passageway and is lost in the glass to fluid to air interfaces 60 in the notch 54 and in the channel 52. As a result the signal beam is not transmitted out either of the middle or the right passageways.

Figure 2D:
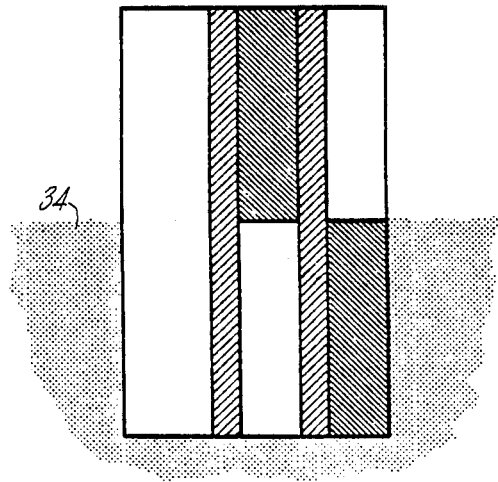

Referring to FIG. 2D, a top view of the sensor of FIGS. 2A-C is shown rotated forward 90° and disposed in the fluid at level 34. The signal beam 36 directed into the left passageway 46 is reflected out a portion of the middle passageway 38 disposed below the fluid level therein and is reflected out of a portion of the right passageway 42 above the fluid level 34.

Figure 3A:
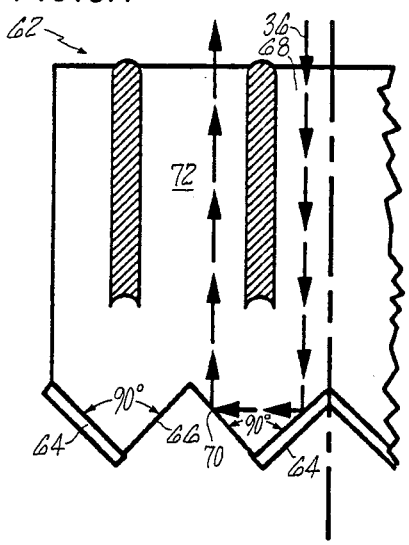
FIG. 3(A-B) is a schematic view of a further embodiment of the fluid level sensor of the invention.
FIG. 3C is a top view of the sensor of FIG. 3(A-B), the sensor having been rotated forward 90° and disposed within a body of fluid.
Figure 3B:
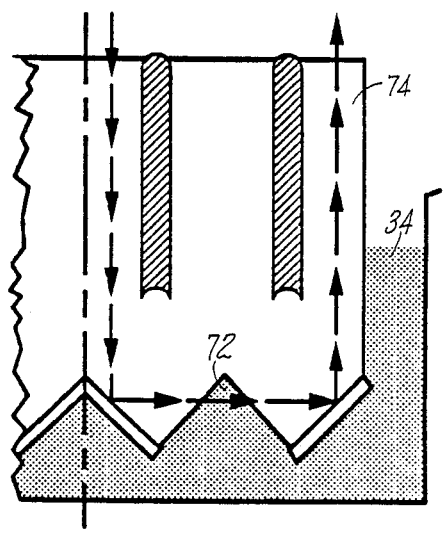

Referring to FIG. 3, a cylindrical, bullseye-type embodiment of the sensor is shown. Referring to FIG. 3A, a half portion 62 of the fluid level sensor is shown (FIG. 3B shows the other half of the sensor). Each half-portion has a pair of mirrored bottom sections 64 arranged at right angles to a right angled notched portion 66. A signal beam 36 is admitted in the center passageway 68, reflected off one mirrored surface 64, off the glass to air interface 70, and out a penultimate passageway 72 when fluid level does not fill the notched portion.

Referring to FIG. 3B, where the fluid level 34 fills the notch portion 66, the signal beam sent down the center passageway 68 is reflected off one mirrored surface 64 through the glass to fluid to glass interface 72, off the other mirrored portion 64 and out an ultimate passageway 74 to indicate the fluid is high enough to fill the notch.

Figure 3C:
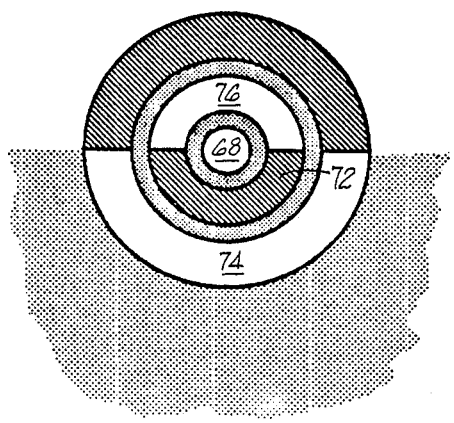

Referring to FIG. 3C, a top view of the sensor of FIG. 3A-B is shown. The sensor is rotated forwar 90° and disposed with a body of fluid having a level 34. A signal beam 36, directed into the center passageway 68, is reflected through a portion of the ultimate passageway 74 disposed below the fluid thereby indicating fluid to that level, and out the portion of the penultimate passageway 76 above the fluid level 34 thereby indicating no fluid above the level 34.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention. Specifically, one of ordinary skill in the art may utilize other types of signal beams, such as lasers or light emanating from fiber optics. One may also utilize optical pick-ups so that the entire fluid level check may be performed automatically. By automatically checking the fluid level, the problems associated with inconveniently placed sight glasses and bad weather or sea conditions may be minimized.

We claim:

1. An optical sensor for detecting fluid level said sensor comprising:
   a first passageway for conducting a signal beam into the sensor, a second passageway for conducting said signal beam from said sensor such that said signal beam may be detected, said first passageway being separated from said second passageway by a first opaque member, a third passageway for conducting said signal beam from said sensor such that said signal beam may be detected said third passageway being separated from said first passageway by a second opaque member,
   a first means for conducting said signal beam from said first passageway to said second passageway if said fluid level is relatively high, and a second means for conducting said signal beam from said first passageway to said third passageway if said fluid level is relatively low.

2. The optical sensor of claim 1 wherein said
   first means includes a sensor to fluid to sensor interface such that said signal beam may pass from said sensor through said fluid and back into said sensor, and
   said second means includes a sensor to air interface such that said signal beam is reflected at said interface.

3. The optical sensor of claim 2 wherein said fluid to sensor interface comprises an opening extending into said sensor in the path of said signal beam beyond said first passageway.

4. The optical sensor of claim 2 wherein said fluid to sensor interface comprises an opening extending into said sensor in the path of said signal beam beyond said third passageway.

5. The optical sensor of claim 2 wherein said sensor to fluid to sensor interface and said sensor to air interface do not conduct or reflect, respectively, said signal beam if obstructed by a sensor to fluid to air interface.

6. An optical sensor for detecting a fluid level, said sensor comprising:
   a first passageway for conducting a signal beam into the sensor, a second passageway for conducting said signal beam from said sensor such that said signal beam may be detected said first passageway being separated from said second passageway by a first opaque member, a third passageway for conducting said signal beam from said sensor such that said signal beam may be detected said third passageway being separated from said second passageway by a second opaque member,
   a first means for conducting said signal beam from said first passageway to said second passageway if said fluid level is relatively high, and a second means for conducting said signal beam from said first passageway to said third passageway if said fluid level is relatively low.

7. The optical sensor of claim 6 wherein said
   first means includes a sensor to fluid to sensor interface such that said signal beam may pass from said sensor through said fluid and back into said sensor and
   said second means includes a sensor to air interface such that said signal beam is reflected at said interface.

8. The optical sensor of claim 7 wherein said fluid to sensor interface comprises an opening extending into said sensor in the path of said signal beam beyond said first passageway.

9. The optical sensor of claim 7 wherein said sensor to fluid to sensor interface and said sensor to air interface do not conduct or reflect, respectively, said signal beam if obstructed by a sensor to fluid to air interface.

10. An optical sensor for detecting a fluid level, said sensor comprising:

a first passageway for conducting a signal beam into the sensor, a second passageway for conducting said signal beam from said sensor such that said signal beam may be detected, a third passageway for conducting said signal beam from said sensor such that said signal beam may be detected, said first passageway being separated from said third passageway by an first opaque member, said third passageway being separated from said second passageway by a second opaque member, a first means for conducting said signal beam from said first passageway to said second passageway if said fluid level is relatively high, and a second means for conducting said signal beam from said first passageway to said third passageway if said fluid level is relatively low.

11. The optical sensor of claim 10 wherein said first means includes a sensor to fluid to sensor interface such that said signal beam may pass from said sensor through said fluid and back into said sensor, and said second means includes a sensor to air interface such that said signal beam is reflected at said interface.

12. The optical sensor of claim 11 wherein said sensor to fluid to sensor interface comprises an opening extending into said sensor in the path of said signal beam beyond said third passageway.

13. The optical sensor of claim 11 wherein said sensor to fluid to sensor interface and said sensor to air interface do not conduct or reflect, respectively, said signal beam if obstructed by a sensor to fluid to air interface.

* * * * *